(12) United States Patent
Sherman et al.

(10) Patent No.: US 11,899,491 B1
(45) Date of Patent: Feb. 13, 2024

(54) SYSTEM AND METHOD FOR TIMING SYNCHRONIZATION

(71) Applicant: BAE Systems Information and Electronic Systems Integration Inc., Nashua, NH (US)

(72) Inventors: Matthew J. Sherman, Succasunna, NJ (US); Mritunjay Sinha, Parsippany, NJ (US); Lawrence Yang, Lake Hiawatha, NJ (US)

(73) Assignee: BAE Systems Information and Electronic Systems Integration Inc.

( * ) Notice: Subject to any disclaimer, the term of this patent is extended or adjusted under 35 U.S.C. 154(b) by 30 days.

(21) Appl. No.: 17/953,992

(22) Filed: Sep. 27, 2022

(51) Int. Cl.
*G06F 1/12* (2006.01)
*H04J 3/06* (2006.01)
*G06F 15/78* (2006.01)

(52) U.S. Cl.
CPC ............ *G06F 1/12* (2013.01); *G06F 15/7814* (2013.01); *H04J 3/0635* (2013.01)

(58) Field of Classification Search
CPC ....... G06F 1/12; G06F 15/7814; H04J 3/0635
See application file for complete search history.

(56) References Cited

U.S. PATENT DOCUMENTS

| 2012/0030495 A1* | 2/2012 | Chandhoke | G06F 1/14 |
| | | | 713/400 |
| 2019/0138047 A1* | 5/2019 | El Kolli | G06F 1/12 |
| 2021/0294722 A1* | 9/2021 | Chapman | G06F 9/542 |
| 2022/0329335 A1* | 10/2022 | Zhang | H04J 3/0644 |

* cited by examiner

*Primary Examiner* — Nitin C Patel
(74) *Attorney, Agent, or Firm* — Sand, Sebolt & Wernow LPA

(57) ABSTRACT

The system and method generates a pulse or a signal that is transmitted between a central processing unit or processor and an Ethernet integrated circuit card to program a trigger generator in the IC. The pulse is effectively a 1PPS signal that is provided to the IC, which may be in the form a field programmable gate array to enable timing synchronization. The trigger in the IC may also generates an interrupt to the processor so a driver in the CPU is instructed to set the next trigger. For the trigger to be accurately controlled, the control routine is implemented in the driver existing in kernel space rather than user space. A routine or protocol periodically polls the interrupt to determine when the trigger must be reset.

19 Claims, 2 Drawing Sheets

SYSTEM AND METHOD FOR TIMING SYNCHRONIZATION

STATEMENT OF GOVERNMENT INTEREST

This invention was made with government support under Prime Contract Number: N00001420C 1060 awarded by the Office of Naval Research ("ONR"). The government has certain rights in the invention.

BACKGROUND

Some radio designs rely on inputs from a Global Positioning System (GPS) or Inertial Navigation System (INS) to provide reference timing for processing time stamps to determine the delays in a network to synchronize clocks associated with two nodes or computers in the network. This reference timing may be accomplished via a One Pulse Per Second (1PPS) time mark generated from the device providing the timing reference. Some devices, including standard interfaces (e.g. RS-422 or Ethernet) and newer iCDL radios include messages and/or the use of a newer protocol called the Precision Time Protocol (PTP).

Precision Timing Protocols (PTP) is a newer timing protocol for coordinating timing between multiple nodes in network architecture. PTP is advantageous for precise timing because it can synchronize nodes to a nanosecond level.

PTP uses hardware timestamps built into an Ethernet adapter. The Ethernet adapter adds or generates timestamps when a message or data signal was transmitted and timestamps when a responsive message or data signal is received. This allows a PTP-based system to very accurately, on the nanosecond level, determine how long it took the message or data signal to transmit from one node or radio to another in network architecture. Improved accuracy is important to ensure nodes or radios in a network are accurately synced to so that signals are synced. For example, two defensive nodes need to be synced together to properly send a signal to a countermeasure from a platform. However, other signals need to be properly sync when sending a secure communication message.

When trying to synchronize clocks or timestamps in a network, it is advantageous to isolate the various latencies or delays, such as the signals traversing the media, that are inherent in the network architecture to achieve proper time synchronization between the various nodes. The PTP allows the system to understand the total delays in the network before receiving the signals from the node that is desired to be synchronized with another node. Understanding the total delays allows for the system to better calculate the synchronization techniques or protocols that are needed to synchronize one node to another.

It is has been determined to be inconvenient to provide this time mark when the node, computer, or radio being controlled is designed to operate in the 1PPS protocol but another radio or node uses a different protocol because newer PTP radios have nanosecond timing that is incompatible with 1PPS radios.

SUMMARY

When radio frequency (RF) systems are spaced apart by a large distance, such tens or hundreds of miles or more, and the two RF systems are networked together, they need a common reference point to know the time. In most RF systems, the common reference system is a global positioning system (GPS) that operates under a universal coordinate time (UTC).

Transferring time and being able to synchronize clocks is useful at a system level. Systems coordinate with GPS to establish a one-pulse-per-second (1PPS) signal, wherein the rising edge of the signal represents the GPS time of when the second begins. An interface or serial bus protocol, such as RS232 or Ethernet, provides a timestamp indicative of a time mark corresponding to a GPS second.

When one node in the a network architecture has established a GPS time, the established GPS time may need to be shared with at least one other node in the network architecture so at least these two nodes share a common reference time. Problems exist with coordinating the nodes to allow them to establish a common reference time. While PTP is generally a solution to establish a common reference time through the use of Ethernet, it is not without faults. For example, when there is a PTP master node coupled with GPS, the PTP master clock provides PTP signaling to the other nodes in the network architecture so that the other nodes can be synchronized to the PTP master clock but, these network configurations lack the ability to trigger pulses within the network to cause the synchronization to occur.

The present disclosure expands and improves on scenarios where legacy PTP components need to synchronize with other nodes in the network. The system includes equipment or assets that include legacy PTP components and capabilities. The legacy components are sometimes referred to as "below deck" equipment because they are physically located below the deck or outer surface of a platform, such as a ship or floating vessel that may be manned or unmanned. The legacy PTP capabilities of the below deck components or assets ensure that the below deck assets or equipment properly sync with the PTP master clock. However, there are "above deck" assets or components that are custom components that may not easily synchronize with the PTP master clock or may not easily synchronize with the below deck equipment or assets. For example, one exemplary above deck or other customer computer system may be a custom modem or radio. The modem or radio may be custom signal processing for various waveforms to perform next generation networking waveforms (NGNW) processing that needs a PTP clock. However, there is also a need for synchronizing the modem with the PTP master clock. The system of the present disclosure enables various components of the system to generate a pulse, which may be 1PPS, from PTP (which runs over standard Ethernet) locally. This enables components of the system to be easily synchronized from a master clock, such as GPS, and function correctly. Some of the assets, components, or nodes may be legacy hardware component(s) already designed to work with an external 1PPS. To accomplish this synchronization between custom components with legacy PTP assets, the present disclosure provides protocols, processes, or computer-implemented methods or software to accomplish said synchronization.

In one aspect, an exemplary embodiment of the present disclosure may provide a signal that is generated between a central processing unit or processor (CPU) and an Ethernet integrated circuit (IC) to program a trigger generator in the IC. This generates a pulse that is effectively a 1PPS signal that is provided to the IC, which may be in the form a field programmable gate array (FPGA) to enable timing synchronization. The Trigger in the IC also generates an interrupt to the processor so a driver in the CPU is instructed to set the next trigger. For the trigger to be accurately controlled, the control routine is implemented in the driver existing in kernel space rather than user space. A routine or protocol periodically polls the interrupt to determine when the trigger must be reset.

One exemplary instantiation of the present disclosure may be a platform implementing next generation networking waveforms (NGNW) amongst other platforms implementing other types of waveforms. One exemplary platform is a floating vessel, regardless whether it is manned or unmanned, that includes "above deck" equipment and "below deck" equipment, previously mentioned. There are processors in each of the above deck equipment and the below deck equipment that must be synchronized. The processors that are below deck control the processors that are above deck. The below deck processors need to precisely control the actions of the above deck equipment for transmitting signals in precise time slots. For example, there may be four millisecond slots in a TDMA system over-the-air that must be known so that an above deck radio or node that is communicating with another radio or node will be enabled to know or determine which time slot the signal is within or is to be populated for transmission. This allows the communication signals to be placed into an appropriate time slot. This allows the signal transmitted over-the-air to be coordinated with the antenna of the radio or node with the system.

In another aspect, an exemplary embodiment of the present disclosure may provide a system for timing synchronization between two or more nodes in network architecture, the system comprising: a master clock; a switch coupled the master clock via a first link, the switch comprising a boundary clock; a physical layer chip (PHY chip) coupled with the switch via a second link, wherein precision timing protocol (PTP) packets are transmitted across the second link between the switch and the PHY chip, and the PHY chip further comprises: PTP timestamp hardware; a physical hardware clock (PHC clock) coupled to the PTP timestamp hardware via a third link, wherein cycle counts are transmitted across the third link between the PHC clock and the PTP timestamp hardware; a trigger pulse generator coupled to the PHC clock via a fourth link, wherein cycle counts are transmitted across the fourth link between the PHC clock and the trigger pulse generator; a system on a chip (SOC) coupled to the PHY chip, wherein the SOC includes: a physical layer driver (PHY driver) to process PTP packets and cycle counts; a PTP application coupled with the PHY driver to process timestamps and sync with the PHC clock; a PHC synchronizer to synchronize the PHC clock with system time; a field programmable gate array (FPGA) coupled to the trigger pulse generator via a fifth, wherein a pulse generated from the trigger pulse generator is transmitted across the fifth link from the trigger pulse generator to the FPGA; a sixth link between PTP timestamp hardware and the PHY driver to transmit timestamps across the sixth link between the PTP timestamp hardware and the PHY driver; a seventh link between the PHY clock and the PHY driver to transmit cycle counts across the seventh link between the PHC clock and the PHY driver; an eighth link between the trigger pulse generator and the PHY driver to transmit a trigger interrupt between and a trigger generator amount or time across the eighth link between the trigger pulse generator and the PHY driver; and wherein the pulse transmitted from the trigger pulse generator to the FPGA is based on the trigger interrupt at the trigger generator amount or time.

In yet another aspect, one exemplary embodiment of the present disclosure may provide a computer implemented method for timing synchronization between two or more nodes in network architecture, the method comprising: generating a first pulse in a trigger pulse generator, wherein the first pulse is a time reference relative to a master clock; transmitting the pulse to a system on a chip (SOC); determining, via the SOC, a deviation of the time reference from timestamps associated with a master time of the master clock, wherein determining the deviation is based on cycle counts relative to a local clock; transmitting a second pulse to a microprocessor based on the deviation of the local clock from the master clock to synchronize the microprocessor with the master clock. This exemplary embodiment or another exemplary embodiment may further include processing, in the microprocessor, the second pulse as a reference for time. This exemplary embodiment or another exemplary embodiment may further include determining a time, in the form of a trigger pulse amount, based on the deviation for when the trigger pulse generator is to transmit the second pulse. This exemplary embodiment or another exemplary embodiment may further include utilizing a count-down timer to count down until the time at which the second pulse it to be transmitted; and repeating the transmission of subsequent pulses to the microprocessor based on subsequent deviations of the local clock from the master clock for continued synchronization of the microprocessor with the master clock. This exemplary embodiment or another exemplary embodiment may further include transmitting a signal from a first node in a computer network at a specific time based on the microprocessor having been synchronized with the master clock. This exemplary embodiment or another exemplary embodiment may further include instructing firmware in the microprocessor with software from the SOC via waveform functionality; and computing in the microprocessor how to modulate a carrier wave for a signal to be transmitted from a first node in a computer network into a desired bit slot. This exemplary embodiment or another exemplary embodiment may further include determining the deviation based on cycle counts relative to the local clock is accomplished by establishing the cycle count in the local clock. This exemplary embodiment or another exemplary embodiment may further include polling the trigger pulse generator to determine whether the trigger pulse generator has triggered the pulse. This exemplary embodiment or another exemplary embodiment may further include wherein polling the trigger pulse generator is accomplished by the SOC, or wherein polling the trigger pulse generator occurs at periodic intervals, or wherein the periodic intervals are less than one second. This exemplary embodiment or another exemplary embodiment may further include maintaining the SOC asynchronous to a trigger interrupt signal contained in the first pulse and the second pulse. This exemplary embodiment or another exemplary embodiment may further include processing the trigger interrupt signal to confirm that the trigger interrupt signal occurred that is adapted to eliminates a need for a synchronization of a subsequent trigger generation interrupt signal as the method is repeated. This exemplary embodiment or another exemplary embodiment may further include determining, via the SOC, the deviation of the time reference from timestamps associated with the master time of the master clock based on cycle counts relative to the local clock occurs in kernel space.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

The present disclosure addresses the need for synchronized timing (i.e., leader/follower timing or master/slave timing) of a node (such as an FPGA) in a network architecture using an existing apparatus, node, or asset. While the system can use many different types of existing apparatus, one exemplary asset, node, or apparatus is an iCDL radio device. The present disclosure includes a trigger pulse generator 14-3, amongst other features. The trigger pulse generator 14-3 generates a pulse 18 that acts as a trigger interrupt 24 signal. The trigger interrupt 24 signal is coupled with a monitoring device, which in one example may be a physical layer driver, for monitoring a physical hardware clock. The trigger pulse generator 14-3 communicates with the monitoring device, for example the physical layer driver (i.e., PHY driver 16-1), that monitors the physical hardware clock to generate a time aligned pulse to the node, asset, or apparatus, which in one example may be a FPGA. In this example the pulse 18 may be a 1PPS pulse, however other pulse frequencies are entirely possible depending on the application specific requirements of the system.

According to one exemplary embodiment, components of the present disclosure may be deployed on ship masts where timing references, such as 1PPS, from a GPS or INS is not easily accessed. The system of the present disclosure enables the components to generate pulse 18, which may be 1PPS, from PTP (which runs over standard Ethernet) locally. This enables components of the system to be easily synchronized from a master clock, such as GPS, and function correctly. Some of the assets, components, or nodes may be legacy hardware component(s) already designed to work with an external 1PPS. Accordingly, generating the same signaling internal to the asset, component, or node simplifies incorporation into a radio design or network architecture.

Figure 1:
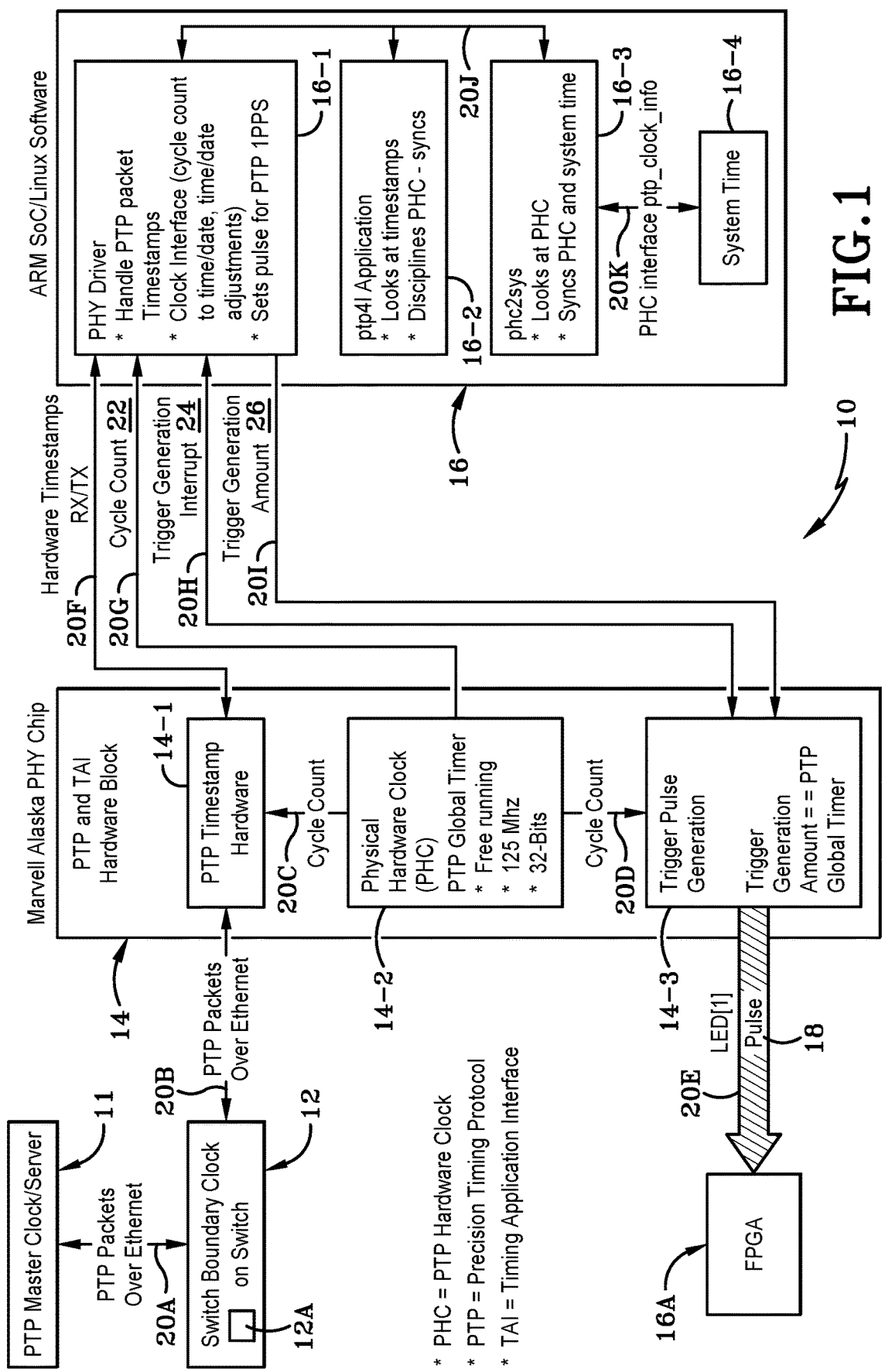
FIG. 1 (FIG. 1) is a schematic view of the system of the present disclosure for synchronizing a node, computer, radio or other network device with a master clock in a network architecture.

FIG. 1 schematically depicts a network architecture system 10 according to one exemplary aspect of the present disclosure. System 10 is configured to perform timing control of nodes, assets, or components in network architecture based on PTP with pulse generation to enable components of the system to be easily synchronized from a master clock. System 10 includes a PTP master clock 11, a switch boundary clock 12, a physical layer (PHY) chip 14, and a system on a chip (SOC) 16. The PHY chip 14 may include PTP timestamp hardware 14-1, a physical hardware clock (PHC) 14-2, and a trigger pulse generator 14-3. In the example of FIG. 1, the PTP timestamp hardware 14-1, the PHC 14-2, and the trigger pulse generator 14-3 are depicted as separate components, however it is to be understood that these components may be combined into a single device if desired to meet application specific implementations of system 10.

One exemplary embodiment may also include a field programmable gate array (FPGA) 16A. In the example of FIG. 1, the FPGA 16A is depicted as a separate component from SOC 16. However, another configuration provides that SOC 16 and FPGA 16A are integrated into a single device or component, such as one FPGA. The SOC 16 may include a PHY driver 16-1, a PTP application 16-2, a PHC synchronizer 16-3, and a system time 16-4, which are depicted as separate components but it is to be understood that these components may also be combined into a single device if desired to meet application specific implementations of system 10.

The PTP master clock 11 may be any master clock operating a PTP protocol that a node in a network architecture desires to synchronize. One exemplary PTP master clock is found within a GPS component, such as a satellite. However, other PTP master clock options are available. For example, the PTP master clock may be the U.S. Naval Observatory. While the PTP master clock 11 is envisioned as a remote master clock in the network architecture, it is possible that the PTP master clock is located locally in system 10.

Switch 12 may be any hardware switch or component that integrates or communications with PTP master clock 11. One exemplary switch 12 is a Cisco Nexus 3000 switch. More particularly, switch 12 may be a Cisco Nexus 31108PC-V. Another example switch 12 is Fibrolan's Falcon R Class and Falcon M Class (PTP Switch (fibrolan.com) which can server as PTP Boundary clocks. The switch 12 is configured to communicate with PTP master clock 11 back-and-forth via PTP packets over Ethernet or another protocol via a link, such as link 20A. Notably, the links described herein, such as link 20A or any of the other described links designated with the reference numeral 20 preceding a letter (i.e., 20A, 20B, 20C, 20D, 20E, 20F, 20G, 20H, 20I, 20J, etc.), may be any type of wired or wireless electrical connections capable of transmitting data between two or more components of system 10.

PHY chip 14 may be any physical layer chip. One exemplary PHY chip capable of implementing various aspects of the present disclosure is an Ethernet transceiver or Ethernet adapter, however other physical layer chips or processors are entirely possible that execute other protocols. One exemplary Ethernet transceiver is manufactured or sold by Marvell under the commercial product name Alaska, such as the Marvel Alaska Marvell Alaska C Ethernet transceiver that may be optimized for 400 Gigabit, 200 Gigabit, 100 Gigabit Ethernet, 50 Gigabit Ethernet and/or 25 Gigabit Ethernet applications. The PHY chip 14 effectuates or establishes a timing application interface (TAI). More particularly, another exemplary PHY chip 14 is Marvell 88E1512-A0-NNP 2I000 Chip. Another chip that would suffice is Marvell 88E1518.

PHY chip 14 includes the PTP timestamp hardware 14-1 that is envisioned to be integrated onto PHY chip 14. However, it is possible for the PTP timestamp hardware 14-1 to be located or disposed at an alternative location in system 10. The PTP timestamp hardware 14-1 is connected with the switch 12 via link 20B. Link 20B enables PTP packets over Ethernet or other protocol to be transmitted back-and-forth along link 20B between switch 20 and PTP timestamp hardware 14-1.

PHY chip 14 further includes PHC clock 14-2 that may be integrated onto PHY chip 14. However, it is possible for PHC clock 14-2 to be located or disposed at an alternative location in system 10. The PHC clock 14-2 is connected with the PTP timestamp hardware 14-1 via link 20C. Link 20C enables cycle counts 22 to be transmitted back-and-forth along link 20C between PHC clock 14-2 and PTP timestamp hardware 14-1. PHC clock 14-2 may be a PTP global timer. In one example, the PHC clock 14-2 is free running, however other scenarios may provide a bounded timing operation if applications specific scenarios require such an operation. One exemplary PHC clock 14-2 operates at 125 Mhz and 32-Bits. Yet, these parameters are examples and any frequency and bit-amount are possible to meet various application specific needs of a similar system. In one embodiment, the PTP timestamp hardware 14-1 and the PHC clock 14-2 are the same clock, and need to be treated as the same hardware. Otherwise, have to include a mechanism to sync the two clocks. As for the alternative hardware, would have to find Ethernet hardware that has a clock that does timestamp (either PHY layer or MAC layer) and can be configured to use the same clock to generate a pulse.

PHY chip 14 further includes the trigger pulse generator 14-3 that is envisioned to be integrated onto PHY chip 14. However, it is possible for trigger pulse generator 14-3 to be located or disposed at an alternative location in system 10. The trigger pulse generator is connected with the PHC clock 14-2 via link 20D. Link 20D enables cycle counts 22 to be transmitted back-and-forth along link 20D between the trigger pulse generator 14-3 and the PHC clock 14-2. The trigger pulse generator 14-3 may have a value or amount or threshold to initiate or trigger the generation amount 26 of a pulse 18 based on the interrupt 24. In one example, the value, amount, or threshold to initiation or trigger a pulse 18 equals or approximately equals the PTP global timer in the PHC clock 14-2, however other scenarios may provide different triggering or initiating value if applications specific scenarios require such an operation. Yet, this configuration is an example to meet various application specific needs of system 10. As described in greater detail herein, when the trigger pulse generator 14-3 generates a pulse 18, the pulse 18 is transmitted from trigger pulse generator 14-3 to the FPGA 16A along link 20E. Recall, the FPGA 16A may be independent from SOC 16 or integrated with SOC 16. Thus, if FPGA 16A is integrated with the SOC 16, then the pulse 18 would also be transmitted to SOC 16 via FPGA 16A along link 20E. While trigger pulse generator 14-3 is shown as being part of PHY chip 14, it is to be understood that the trigger pulse generator 14-3 may be a component of the SOC 16 to meet a variety of application specific needs. Thus, it is to be understood that trigger pulse generator 14-3 is not limited to be located on or as part of PHY chip 14 and can be a component of another part of system 10, such as the SOC 16, or may be an independent element of system 10

The pulse 18 that is generated by trigger pulse generator 14-3 may be in the form of a data signal representing a trigger pule amount. The pulse 18 replicates the 1PPS from GPS. The pulse 18 is a pulse per second (PPS or 1PPS), nominally low value of OV to a high of 1.8 V, of width 120 nanoseconds. The rising edge is used to indicate the start of the second. The voltages and pulse width can be modified according to what is needed by the receiving device(s). The PPS is to serve as a precision timing reference. It is aligned to Coordinated Universal Time (UTC) and GPS time, and indicates each second of UTC time to give precise and accurate frequency, time, and phase. Most GPS receivers offer a PPS/1PPS to act as a timing reference, this invention enables a generation of similar signal without direct access to a GPS receiver and with access only to a computer network running the PTP protocol.

SOC 16 may be a media access control (MAC) and includes a PHY driver 16-1 that is envisioned to be integrated onto SOC 16. However, it is possible for PHY driver 16-1 to be located or disposed at an alternative location in system 10. One exemplary PHY driver 16-1 is a system-on-a-chip provided by Arm Limited. Another SOC that is suitable is the a programmable SOC offered by Intel, such as the Aria10 ARM SOC. The ARM-based SOC 16 tightly couples a highly optimized "hard" processor system (HPS) with an on-chip FPGA 16A. FPGA 16A is coded with software to implement the desired functions of the present disclosure to synchronize nodes in network architecture to a master clock 11. The HPS, which includes a dual-core ARM processor, multiport memory controller, and multiple peripheral elements, offers up to 4,000 MIPS of processing performance for under 1.8 W. On-chip FPGA fabric can be customized by the user to create application-specific logic. Programmability of SOC16 allows for ready adaptation to new or changing communications standards, networking protocols, and performance tuning. SOC 16 delivers suitable performance, low power, and high density possible for the process node.

The PHY driver 16-1 is connected with PTP timestamp hardware 14-1 via link 20F. Link 20F enables receive/transmit hardware timestamps to be transmitted back and forth along link 20F between the PHY driver 16-1 and the PTP timestamp hardware 14-1. This connection along link 20F enables the PHY driver 16-1 to handle PTP packet timestamps from PTP timestamp hardware 14-1.

The PHY driver 16-1 is connected with PHC clock 14-2 via link 20G. Link enables cycle counts 22 to be transmitted back and forth along link 20G between the PHY driver 16-1 and the PHC clock 14-2. This connection along link 20G enables the PHY driver 16-1 to establish and maintain a clock interface to cycle count 22 to a programmed parameter, such as, time/date or time/date adjustment.

The PHY driver 16-1 is connected with trigger pulse generator 14-3 via link 20H. Link 20H enables an interrupt signal, such as a trigger generation interrupt 24, to be transmitted back and forth along link 20H between the PHY driver 16-1 and the trigger pulse generator 14-3. This connection along link 20H enables the PHY driver 16-1 to set the pulse for PTP to 1PPS. Additionally, a link 20I may connect PHY driver 16-1 with trigger pulse generator 14-3. Link 20I enables a trigger generation amount 26 or signal time to be transmitted along link 20I from the PHY driver 16-1 to the trigger pulse generator 14-3. Alternatively, the link 20I enables a trigger generation amount 26 or signal time to be transmitted back and forth along link 20I between the PHY driver 16-1 and the trigger pulse generator 14-3. Further, it is likely that links 20H and 20I are to be combined into a single link between the PHY driver 16-1 to the trigger pulse generator 14-3 to accomplish the functionality of transmitting the trigger generation interrupt 24 signal and the trigger generation amount 26. However links 20H and 20I were schematically shown as separate to identify the two different functions and signals communicated between the PHY driver 16-1 to the trigger pulse generator 14-3. Thus, it is to be understood that links 20H and 20I may be combined into one link between the PHY driver 16-1 to the trigger pulse generator 14-3 may effectuate transmission of the trigger generation interrupt 24 signal and the trigger generation amount 26.

SOC 16 includes the PTP application 16-2 that is envisioned to be integrated onto SOC 16. However, it is possible for PTP application 16-2 to be located or disposed at an alternative location in system 10. The PTP application 16-2 is connected with PHY driver 16-1 and PHC synchronizer 16-3 via link 20J. Link 20J enables PTP device signals to be transmitted back and forth along link 20J between the PHY driver 16-1, the PTP application 16-2, and the PHC synchronizer 16-3. The PTP application 16-2 is configured to review timestamps from PTP timestamp hardware 14-1 sent via link 20J via PHY driver 16-1 and assist with disciplining the PHC clock 14-2 and assist with syncing the SOC 16 with PTP master clock 11 or switch 12. This is performed via instructions, protocol, or code to adjust time (settime64, adjtime) to set nsec, or adding or subtracting the delta value, as described in greater detail herein below.

SOC 16 includes the PHC synchronizer 16-3 that is envisioned to be integrated onto SOC 16. However, it is possible for PHC synchronizer 16-3 to be located or disposed at an alternative location in system 10. The PHC synchronizer 16-3 is connected with PHY driver 16-1 and PTP application 16-2 via link 20J. Link 20J enables PTP device signals to be transmitted back and forth along link 20J between the PHY driver 16-1, the PTP application 16-2, and the PHC synchronizer 16-3. The PHC synchronizer 16-3 is configured to review the PHC clock 14-2 sent via link 20J via PHY driver 16-1 and syncing the PHC clock 14-2 and with the system time 16-4. The process of reviewing and syncing the PHC clock 14-2 are described in greater detail herein below. System time 16-4 is connected with PHC synchronizer via link 20K. Link 20k enables PHC interface PTP clock signals to be transmitted back and forth along link 20K between the PHC synchronizer 16-3 and the system time 16-4.

Having thus described the physical configuration of one exemplary instantiation of system 10 in FIG. 1, reference is now made to the operation of system with respect to FIG. 1.

In some instances, the PTP master clock 11 is isolated by various switches from the target node that desires to communicate with the master clock 11. For example a clock in the SOC 16, represented by system time 16-4, should be in sync with PTP master clock 11. If there is a switch, such as switch 12, between the PTP master clock 11 and the SOC 16, there may be a delay caused by switch 12 that is non-deterministic. For example, if an Ethernet signal is sent or transmitted through link 20A from PTP master clock 11 to switch 12, it is unknown whether the delay through switch 12 will be constant. Thus, the delay is non-deterministic as it will not be the same every time. To accommodate for this, the switch 12 may include a boundary clock 12A within switch 12. The boundary clock 12A enables the switch 12 to become or effectively function as the master clock. The boundary clock 12A syncs or slaves to the PTP master clock 11 and then acts as the master clock for the other hardware components in system 10, such as the PHY chip 14 and the SOC 16 (and FPGA 16A). With this distributed approach, the amount of indeterminacy is reduced, or otherwise reduces signal variability between the PHY chip 14, the SOC 16 (and FPGA 16A) and the PTP master clock 11. As such, the PHY chip 14, the SOC 16 (and FPGA 16A) sync to the switch 12 and boundary clock 12 in one embodiment.

The PHY chip 14 performs the signaling with switch 12 to obtain Ethernet messages from switch 12. Then, the Ethernet messages are transmitted from PHY chip 14 to SOC 16 via links 20F, 20G, and 20H/20I. The SOC 16 processes the Ethernet messages to generate an Ethernet MAC. Additionally, the PHY chip 14 timestamps the Ethernet messages when they are received. More particularly, PTP timestamp hardware 14-1 will timestamp the Ethernet message received over link 20B from switch 12. The PTP timestamp hardware 14-1 coordinates with PHC clock 14-2 to accomplish the timestamp by providing the timestamp to the PHC clock 12. Since the PHC clock 14-2 is a fast clock (125 Mhz at 32-Bits), the PHY chip 14 can perform an accurate timestamp as to when the Ethernet message or signal was received. Notably, the switch 12 also timestamps the messages or signals when they are sent over link 20B to the PHY chip 14. Thus, there are two timestamps, a first timestamp from the switch 12 representing when the Ethernet message was sent over link 20B and a second timestamp generated from PTP Timestamp hardware 14-1 representing the time at which the Ethernet message was received into PHY chip 14.

Then, the PHY driver 16-1 on the SOC 16 receives the first and second timestamps from the PHY chip 14 along 20F. Recall that in this example, the PHY chip 14 is implementing the physical layer of the Ethernet. The PHY driver 16-1 receives the timestamps from the PTP timestamp hardware 14-1 over link 20F. The PHY driver 16-1 includes software to process the timestamps from the PTP timestamp hardware 14-1. The software of the PHY driver 16-1 manages the hardware by providing the hardware timestamps and methods to get time from and adjust the PHC clock 14-2 via an interface (for example, PTP hardware clock infrastructure for Linux). The PHY chip 14 hardware captures timestamps when special PTP sync packets are sent and received. Via the driver and PTP interface, a PTP application software, such as LinuxPTP (unmodified), is notified when these packets are received or sent, and uses the PTP interface to get the associated hardware timestamps. The PTP application software, (e.g., LinuxPTP) processes the timestamps to calculate the offset and via the PTP interface, adjusts the PHC to the master clock. It also synchronizes the system time to the PHC clock 14-2. For this disclosure, the master clock 11 (or switch 12) are considered to be "synced" with the system time 16-4 when they are within four microseconds or less with each other. However, it is possible to achieve an accuracy of less than one microseconds using the techniques described herein. Time stamps may be processed via available PTP software such as Open Source LinuxPTP.

In one exemplary embodiment, a version of system of 10 may be utilized to detect cycle counts 22 generated from PHC clock 14-2. The PHC clock 14-2 is a high speed, free running clock. The time from PHC clock 14-2 may be used as a reference to determine a time at which the timestamps were received to confirm whether the time from PHC clock 14-2 matched the timestamps. For example, the system 10 can determine what time the PHC clock 14-2 is operating, and rather than changing or controlling PHC clock 14-2, the system may determine what offset or time-deviation instruction is needed is determine the appropriate time. However, when using this protocol, the system 10, in this example, may not necessarily guarantee the correct time due to multiple threads in the processor that must be shared with multiple CPU tasks (i.e., threads) of the processor. The threads compete with each other for processor capabilities. Consequently, unless there is a way for marking a thread as extremely high priority, the system does not exactly know when that thread will activate to read the clock. Thus, system is not exactly certain in determining the time delay from when the timestamp was received to when the cycle count 22 was read, which injects or creates imprecision in the system. To combat this problem with the network-centric architecture of system, the system 10 of the present disclosure directly controls or at least reads the cycle counts 22 of PHC clock 14-2 in a precise manner.

To directly control or at least read the cycle counts 22 of PHC clock 14-2 in a precise manner, one exemplary embodiment of the system 10 generates an interrupt trigger or interrupt signal 24 via trigger pulse generator 14-3. When utilizing an interrupt trigger or interrupt signal 24, there is ordinarily a piece of hardware that is part of either the PHY chip core 14 (or it could be part of SOC 16) but it is independent of the threads or CPU tasks that the processor must implement. The trigger pulse generator 14-3 counts down in a precise manner to determine when a trigger needs to generator the interrupt trigger or interrupt signal 24.

The usage of the trigger pulse generator 14-3 that generates the interrupt signal 24 or interrupt trigger forces the system 10 to read the cycle counts 22 from the PHC clock 14-2 in a precise manner. One exemplary implementation sets a time period in the PHY chip 14 that is referenced to the PHC clock 14-2. In doing so, the trigger pulse generator 14-3 will read the PHC clock 14-2 at each given time period. This allows the PHY chip 14 to determine when PHC clock 14-2 should be read next. Then, the system sets a timer for the trigger pulse generator 14-3 to activate from a standby state and read the time of the PHC clock 14-2 in accordance with the set time period to obtain the cycle count 22. The trigger generation amount 26 is sent across link 20I is representative of the signal corresponding to the time period for when the trigger pulse generator 14-3 must read the PHC clock 14-2. This results in a more accurate timestamp as to when to check or review the PHC clock 14-2.

One exemplary set of instructions or protocols utilized to compute the time, based on the information received from the PHY chip 14, includes the following steps. The SOC 16 may run code, such as Linux, however any code may suffice. The SOC 16 may include standardized PTP components. However, these standardized PTP components are often not configured to interface with the PHY chip 14. Thus, specific instructions, protocols or code is needed to allow the SOC 16 to interface with the PHY chip 14. More particularly, specific instructions, protocols or code in the PHY driver 16-1 are needed to couple with the PHC clock 14-2 and the trigger pulse generator 14-3. While these specific instructions, protocols or code are driver code in the kernel space, another particular example implement the protocols or code in the user space. One exemplary set of instructions, protocols or code to track the time between the PHY driver 16-1 and the PHC clock 14-2 and the trigger pulse generator 14-3 include a command code to obtain hardware timestamps, such as a C-code directory (ideviptp0) to keep track of cycle counts 22 with time, which may be in nanoseconds (ns). The code also includes an instruction to determine the most recent cycle counter value (cycle_last), an instruction determine the time in count of nanoseconds (nsec) of the most recent cycle value (cycle_last), and an instruction to determine an accumulated amount of the fractional amount in nanoseconds (frac).

The instruction, protocols, or code may execute the following equation to convert the cycle count 22 into nanoseconds:

$$ns = ((cycles * mult) + frac) >> shift \quad \text{(Equation 1)}.$$

In one exemplary instantiation, the nominal or initial values of mutt may equal $2^{31}$ and shift may be equal 28. Then, the function multiplies and shifts scales by $2^3$, which is 125 MHz to ns.

To further compute the adjustments for when the next time is to be set for the trigger pulse generator 14-3 to be implemented, the PHC clock 14-2 must be disciplined to sync with the PTP master clock 11 or switch 12. This is performed via instructions, protocol, or code to adjust time (settime64, adjtime) to set nsec, or adding or subtracting the delta value. Also needed is fine adjustment (adjfine) to change mutt via scaled ppm.

When reading the PHC clock 14-2, the ideviptp0 give current (Unix) time by calculating the cycle delta since the most recent cycle count 22 was read. This is implemented in gettimeex64 via:

$$nsec_{now} = nsec_{last} + (((cycles\ now - cycles_{last}) * mask) * mult + frac) >> shift \quad \text{(Equation 2)}.$$

Then, a mask equals −1 (i.e., 0xFFFFFFFF) for two's complement subtraction of a non-64 bit counter. Some portions or excerpts of some exemplary source code detailing this operation is shown below in TABLE 1.

TABLE 1

Exemplary Cycle nsec source code

```
/**
 * struct timecounter - layer above a %struct cyclecounter which counts
 nanoseconds
 *      Contains the state needed by timecounter_read( ) to detect
 *      cycle counter wrap around. Initialize with
 *      timecounter_init( ). Also used to convert cycle counts into the
 *      corresponding nanosecond counts with timecounter_cyc2time( ). Users
 *      of this code are responsible for initializing the underlying
 *      cycle counter hardware, locking issues and reading the time
 *      more often than the cycle counter wraps around. The nanosecond
 *      counter will only wrap around after ~585 years.
 * @cc:               the cycle counter used by this instance
 * @cycle_last:       most recent cycle counter value seen by
 *                    timecounter_read( )
 * @nsec:             continuously increasing count
 * @mask:             bit mask for maintaining the 'frac' field
 * @frac:             accumulated fractional nanoseconds
 */
struct timecounter {
        const struct cyclecounter *cc;
        u64 cycle_last;
        u64 nsec;
        u64 mask;
        u64 frac;
};
/**
 * struct cyclecounter - hardware abstraction for a free running counter
```

TABLE 1-continued

Exemplary Cycle nsec source code

```
 *      Provides completely state-free accessors to the underlying hardware.
 *      Depending on which hardware it reads, the cycle counter may wrap
 *      around quickly. Locking rules (if necessary) have to be defined
 *      by the implementor and user of specific instances of this API.
 *
 * @read:         returns the current cycle value
 * @mask:         bitmask for two's complement
 *                subtraction of non 64 bit counters,
 *                see CYCLECOUNTER_MASK( ) helper macro
 * @mult:         cycle to nanosecond multiplier
 * @shift:        cycle to nanosecond divisor (power of two)
 */
struct cyclecounter {
        u64 (*read)(const struct cyclecounter *cc);
        u64 mask;
        u32 mult;
        u32 shift;
};
/**
 * timecounter_read - return nanoseconds elapsed since timecounter_init( )
 *             plus the initial time stamp
 * @tc:    Pointer to time counter.
 *
 * In other words, keeps track of time since the same epoch as
 * the function which generated the initial time stamp.
 */
u64 timecounter_read(struct timecounter *tc)
{
        u64 nsec;
        /* increment time by nanoseconds since last call */
        nsec = timecounter_read_delta(tc);
        nsec += tc->nsec;
        tc->nsec = nsec;
        return nsec;
}
/**
 * timecounter_read_delta - get nanoseconds since last call of this function
 * @tc:    Pointer to time counter
 *
 * When the underlying cycle counter runs over, this will be handled
 * correctly as long as it does not run over more than once between
 * calls.
 *
 * The first call to this function for a new time counter initializes
 * the time tracking and returns an undefined result.
 */
static u64 timecounter_read_delta(struct timecounter *tc)
{
        u64 cycle_now, cycle_delta;
        u64 ns_offset;
        /* read cycle counter: */
        cycle_now = tc->cc->read(tc->cc);
        /* calculate the delta since the last timecounter_read_delta( ): */
        cycle_delta = (cycle_now - tc->cycle_last) & tc->cc->mask;
        /* convert to nanoseconds: */
        ns_offset = cyclecounter_cyc2ns(tc->cc, cycle_delta,
                            tc->mask, &tc->frac);
        /* update time stamp of timecounter_read_delta( ) call: */
        tc->cycle_last = cycle_now;
        return ns_offset;
}
/**
 * cyclecounter_cyc2ns - converts cycle counter cycles to nanoseconds
 * @cc:          Pointer to cycle counter.
 * @cycles:   Cycles
 * @mask:     bit mask for maintaining the 'frac' field
 * @frac:     pointer to storage for the fractional nanoseconds.
 */
static inline u64 cyclecounter_cyc2ns(const struct cyclecounter *cc,
                            u64 cycles, u64 mask, u64 *frac)
{
        u64 ns = (u64) cycles;
        ns = (ns * cc->mult) + *frac;
        *frac = ns & mask;
        return ns >> cc->shift;
```

The code from TABLE 1 teaches when to compute the adjustments that need to be performed for when to set the next timer. For example, as shown in FIG. 1, the trigger pulse generator 14-3 includes a timer that that must be reset based on adjustments from the previous cycle count. This results in a periodic adjustment of when the timer in the trigger pulse generator 14-3 is executed based on what offsets or deviations are detected from the timestamps from the PTP master clock 11 or switch 12.

System 10 may implement a PTP one PPS functionality. 1PPS is used as a time mark in conjunction with the timestamp on a different interface, such as Ethernet or RS-232. The hardware can run of the standard timing systems of 1PPS. System 10 can synthesize a 1PPS to feed the hardware so the hardware see no difference in running off PTP versus 1PPS. This is advantageous so that the same firmware can be leveraged to allow legacy components to be utilized.

To implement the PTP 1PPS functionality, the system will use the PHY trigger pulse generation function from the trigger pulse generator 14-3. The PHY chip 14 or a component of the PHY chip 14 generates pulse 18 via a trigger generation response when the PTP master clock 11 or switch 12 cycle count matches a configured value of the trigger generation amount 26 sent via link 20I from the PHY driver 16-1. Then, PHY chip 14 configures for a time X the pulse to be generated. Then, at a later time, such as one second later, the PHY chip 14 configures for a time X+1 the pulse to be generated. This process is then repeated. The PTP 1PPS sets future pulses at time X or cydes$_{future}$. Then, the system 10 determines the future time in count of nanoseconds (nsec) via:

$$nsec_{future} = (nsec_{current} + 1 \text{ second}) \text{ rounded to whole second} \quad \text{(Equation 3)}$$

and $$cycles_{future} = \left( \frac{((nsec_{future} - nsec_{last}) \ll \text{shift}) - frac}{mult} + cycles_{last} \right) \quad \text{(Equation 4)}$$

$$modulo(2^{\wedge}32).$$

Then, the system 10 sets the Trigger Generation Amount 26 to equal cydesfurure. One exemplary feature the present disclosure is that software implements the calculations for the reverse Equation 4, to cyclesfuture from nanoseconds.

Figure 2:
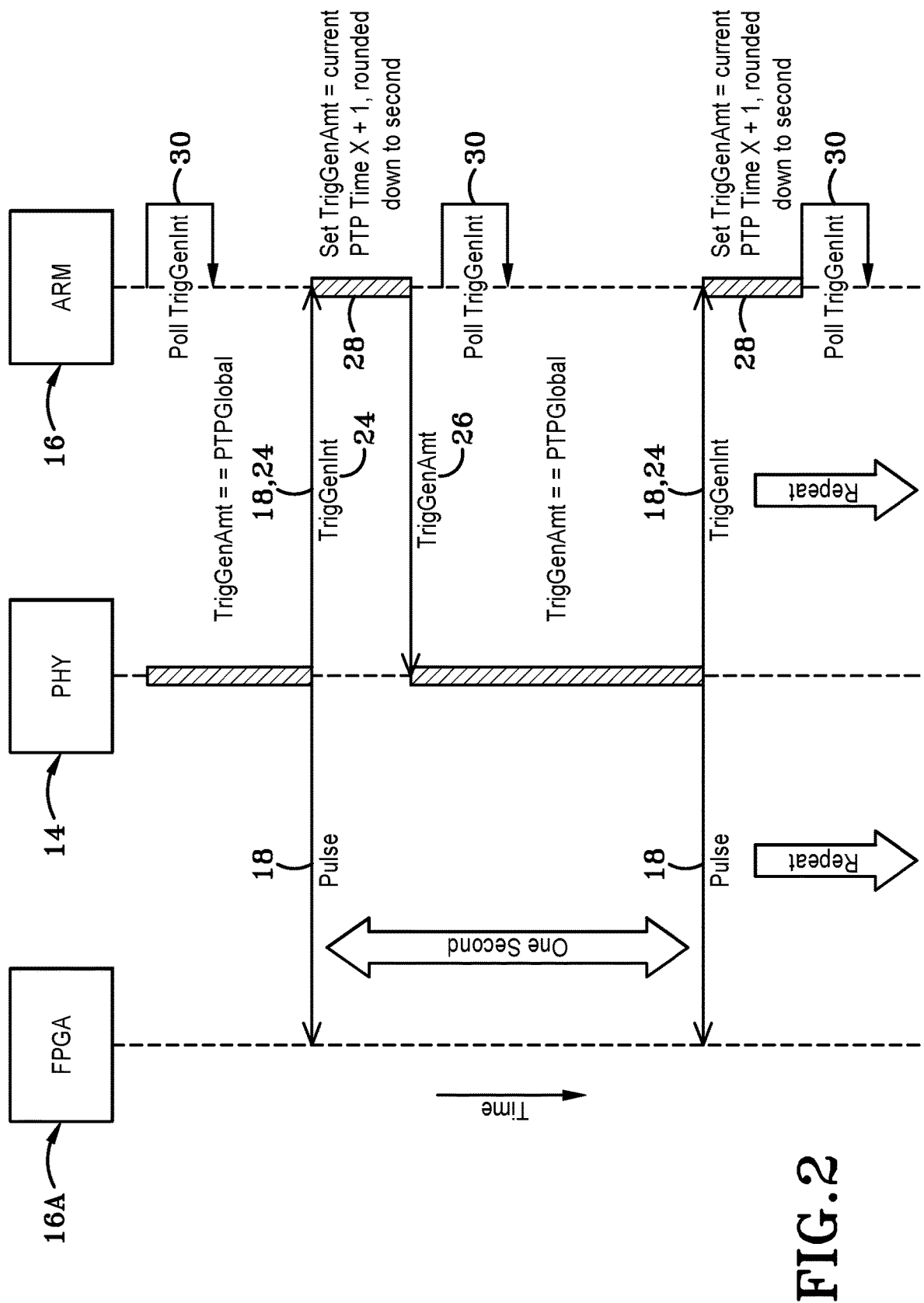
FIG. 2 (FIG. 2) is a schematic timeline configuration depicting the operational timing of pulses generated in a PHY chip that are transmitted to a SOC and a FPGA.

FIG. 2 depicts a 1PPS sequence or flow diagram for generating pulse 18 or hardware trigger at 1PPS that is transmitted to the SOC 16 and the FPGA 16A. The PHY chip 14 generates pulse 18. The FPGA 16A uses pulse 18 as a reference for time, which may be the actual modem. Thus, pulse 18 is also sent to SOC 16 that uses the pulse 18 as its trigger to check the cycle count 22 to determine how far off or the deviation the SOC 16 is relative to the time marks it is receiving compared to the PTP master clock 11 or switch 12. Then, SOC 16 can determine the time it needs to set to generate the next trigger pulse amount to be generated (through addition or subtraction), which referred to as Set TrigGenAmt 28. The SOC 16 counts down until the time to generate the trigger generation amount 26 and then the process repeats.

With continued reference to FIG. 2, the FPGA 16A receives pulse 18 and utilizes the pulse with counters and state machines present on the FPGA 16A that need to be synchronized. The synchronization of the FPGA 16A enables a desired transmission at a specific microsecond on the global count of GPS. Thus, the firmware in the FPGA 16A is instructed from the software in the SOC 16 via waveform functionality. For the waveform to operate correctly, it must have accurate time. The waveform in the PHY chip 14 is instructing the transmission of the signal at a specific time. A physical layer in the FPGA 16A, for an on-the-air waveform, is computing exactly how to modulate the carrier, and what bit goes in which bit slot. Then, the FPGA 16A sends those bits to an antenna at a precise time based on receiving pulse 18 from PHY chip 14.

Notably, while the embodiments shown herein utilize the PHC clock 14-2 as a counter, other reference clocks may be utilized that are in other locations of system 10. For example, the SOC 16 has high precision timers that could be utilized to establish cycle counts 22 instead of PHC clock 14-2. Thus, it is to be understood that the reference clock utilized to establish the cycle counts 22 can be located in any location or on any chip in system 10 unless explicitly stated otherwise.

Additionally, the trigger pulse generator 14-3 is polled by SOC 16. Polling the trigger pulse generator 14-3 is shown in FIG. 2 as Poll TrigGenlnt 30. Poll TrigGenlnt 30 periodically determines whether the trigger pulse generator 14-3 has triggered. By way of polling, the processing in the SOC 16 is asynchronous to trigger generator interrupt 24. The interrupt 24 occurs, then the Poll TrigGenlnt 30 polls the interrupt to 24 to confirm that it occurred. Then, once the Poll TrigGenlnt 30 confirms that the interrupt 24 occurred, then the interrupt will be processed. This is advantageous because it eliminates the need for a specific synchronization of the next or subsequent trigger generation interrupt 24 as the process is repeated. Thus, the polling can occur at periodic intervals, wherein the periodic intervals of the polling are less than one second (such as 100 ms), to determine whether the processing for the Trigger Generation Amount 26 and the Set TrigGenAmt 28 must occur.

With respect to a PTP 1PPS implementation, the present disclosure overcomes some of the previous difficulties associated with operating in user space. Recall, when operating in user space, it is difficult to obtain precise timing. Now, by operating in kernel space, the present disclosure is able to get more precise timing on the microsecond order or less. The present disclosure operates in kernel space because some of the variables that are needed to accomplish the processing are only available in kernel space and not available in user space. This required that the instructions, protocols, or code were added to the PHY driver 16-1 to access some key variables, such as cycles or cycle counts 22.

As described herein, aspects of the present disclosure may include one or more electrical or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A computer implemented method for timing synchronization between two or more nodes in network architecture, the method comprising:
generating a first pulse in a trigger pulse generator, wherein the first pulse is a time reference relative to a master clock;
transmitting the first pulse to a system on a chip (SOC);
determining, via the SOC, a deviation of the time reference from timestamps associated with a master time of the master clock, wherein determining the deviation is based on cycle counts relative to a local clock;
transmitting a second pulse to a microprocessor based on the deviation of the local clock from the master clock to synchronize the microprocessor with the master clock.

2. The method of claim 1, further comprising:
triggering the first pulse when cycle counts of the master clock match a trigger generation amount;
determining future times for additional pulses to be triggered after the second pulse via $$nsec_{future} = (nsec_{current} + 1 \text{ second}) \text{ rounded to whole second}$$

and $$cycles_{future} = \left( \frac{((nsec_{future} - nsec_{last}) \ll shift) - frac}{mult} + cycles_{last} \right) modulo(2^{\wedge}32).$$

3. The method of claim 1, further comprising:
processing, in the microprocessor, the second pulse as a reference for time.

4. The method of claim 1, further comprising:
determining a time, in the form of a data signal representing a trigger pulse amount, based on the deviation for when the trigger pulse generator is to transmit the second pulse.

5. The method of claim 4, further comprising:
utilizing a count-down timer to count down until the time at which the second pulse it to be transmitted; and
repeating the transmission of subsequent pulses to the microprocessor based on subsequent deviations of the local clock from the master clock for continued synchronization of the microprocessor with the master clock.

6. The method of claim 1, further comprising:
transmitting a signal from a first node in a computer network at a specific time based on the microprocessor having been synchronized with the master clock.

7. The method of claim 1, further comprising:
instructing firmware in the microprocessor with software from the SOC via waveform functionality; and
computing in the microprocessor how to modulate a carrier wave for a signal to be transmitted from a first node in a computer network into a desired bit slot.

8. The method of claim 1, wherein determining the deviation based on cycle counts relative to the local clock is accomplished by establishing the cycle count in the local clock.

9. The method of claim 1, further comprising:
polling the trigger pulse generator to determine whether the trigger pulse generator has triggered the pulse.

10. The method of claim 9, wherein polling the trigger pulse generator is accomplished by the SOC.

11. The method of claim 9, wherein polling the trigger pulse generator occurs at periodic intervals.

12. The method of claim 11, wherein the periodic intervals are less than one second.

13. The method of claim 9, further comprising:
maintaining the SOC asynchronous to a trigger interrupt signal contained in the first pulse and the second pulse.

14. The method of claim 13, further comprising:
confirming that the trigger interrupt signal occurred, wherein confirming that the trigger interrupt occurred is adapted to eliminate a need for a synchronization of a subsequent trigger generation interrupt signal as the method is repeated.

15. The method of claim 9, wherein determining, via the SOC, the deviation of the time reference from timestamps associated with the master time of the master clock based on cycle counts relative to the local clock occurs in kernel space.

16. A system for timing synchronization between two or more nodes in network architecture, the system comprising:
timestamp hardware to generate timestamps in data;
a physical hardware clock (PHC clock), wherein cycle counts of the PHC clock are transmitted between the PHC clock and the timestamp hardware;
a trigger pulse generator coupled to the PHC clock, wherein cycle counts of the PHC clock are transmitted between the PHC clock and the trigger pulse generator;
a physical layer driver (PHY driver) to process data packets and cycle counts;
an application coupled with the PHY driver to process timestamps and sync with the PHC clock;
a PHC synchronizer to synchronize the PHC clock with system time; and
a microprocessor coupled to the trigger pulse generator, wherein a pulse generated from the trigger pulse generator is transmitted from the trigger pulse generator to the microprocessor;
wherein the pulse transmitted from the trigger pulse generator to the microprocessor is based on a trigger interrupt at a trigger generator interrupt time.

17. The system of claim 16, wherein the microprocessor is a field programmable gate array (FPGA) coupled to the trigger pulse generator, wherein the pulse generated from the trigger pulse generator is transmitted from the trigger pulse generator to the FPGA.

18. The system of claim 17, further comprising:
a master clock;
a switch coupled the master clock, and the switch comprising a boundary clock.

19. A system for timing synchronization between two or more nodes in network architecture, the system comprising:
a master clock;
a switch coupled the master clock via a first link, the switch comprising a boundary clock;
a physical layer chip (PHY chip) coupled with the switch via a second link, wherein precision timing protocol (PTP) packets are transmitted across the second link between the switch and the PHY chip, and the PHY chip further comprises:
PTP timestamp hardware;
a physical hardware clock (PHC clock) coupled to the PTP timestamp hardware via a third link, wherein cycle counts are transmitted across the third link between the PHC clock and the PTP timestamp hardware;
a trigger pulse generator coupled to the PHC clock via a fourth link, wherein cycle counts are transmitted across the fourth link between the PHC clock and the trigger pulse generator;
a system on a chip (SOC) coupled to the PHY chip, wherein the SOC includes:
a physical layer driver (PHY driver) to process PTP packets and cycle counts;
a PTP application coupled with the PHY driver to process timestamps and sync with the PHC clock;
a PHC synchronizer to synchronize the PHC clock with system time;
a field programmable gate array (FPGA) coupled to the trigger pulse generator via a fifth link, wherein a pulse generated from the trigger pulse generator is transmitted across the fifth link from the trigger pulse generator to the FPGA;
a sixth link between PTP timestamp hardware and the PHY driver to transmit timestamps across the sixth link between the PTP timestamp hardware and the PHY driver;
a seventh link between the PHY clock and the PHY driver to transmit cycle counts across the seventh link between the PHC clock and the PHY driver;
an eighth link between the trigger pulse generator and the PHY driver to transmit a trigger interrupt between and a trigger generator amount or time across the eighth link between the trigger pulse generator and the PHY driver; and
wherein the pulse transmitted from the trigger pulse generator to the FPGA is based on the trigger interrupt at the trigger generator amount or time.

* * * * *